United States Patent [19]

Feuer

[11] Patent Number: 5,710,269
[45] Date of Patent: Jan. 20, 1998

[54] METHOD OF MAKING STARCH ACETATE USING AN ACID CATALYST

[75] Inventor: Bernice I. Feuer, Berkeley Heights, N.J.

[73] Assignee: Hoechst Celanese Corp., Somerville, N.J.

[21] Appl. No.: 584,931

[22] Filed: Jan. 16, 1996

[51] Int. Cl.$^6$ .................... C08B 31/02; C08B 33/02; C08B 35/02
[52] U.S. Cl. .................... 536/107; 536/110
[58] Field of Search .................... 536/107, 110

[56] References Cited

U.S. PATENT DOCUMENTS

| | | |
|---|---|---|
| 2,961,440 | 11/1960 | Kerr et al. .................... 536/107 |
| 3,795,670 | 3/1974 | Mark et al. . |
| 4,238,604 | 12/1980 | Katcher et al. . |
| 4,720,544 | 1/1988 | Schouten .................... 536/107 |
| 5,205,863 | 4/1993 | Elion . |

FOREIGN PATENT DOCUMENTS

| | | |
|---|---|---|
| 0 204 353 A1 | 12/1986 | European Pat. Off. . |
| 1409769 | 10/1975 | United Kingdom . |

*Primary Examiner*—Nathan M. Nutter
*Attorney, Agent, or Firm*—Mary Bak; John M. Genova

[57] ABSTRACT

Methods of synthesizing starch acetate containing at least 20% high molecular weight carbohydrates using a MSA catalyst alone, or in combination with a co-catalyst promoting cross-linking, such a phosphoric acid, are described. The MSA is desirably added slowly following beginning of the exothermic reaction of starch, acetic acid and acetic anhydride.

24 Claims, No Drawings

METHOD OF MAKING STARCH ACETATE USING AN ACID CATALYST

FIELD OF THE INVENTION

The present invention relates to the field of the preparation of starch acetate, and particularly to an improved process thereof.

BACKGROUND OF THE INVENTION

Dry starch is generally a 25:75% mix of linear amylose and amylopectin macromolecules composed of D-glucose units. The amylose is a relatively linear polymer of D-glucose units jointed by $(1{\rightarrow}4)$-$\alpha$-D links and the amylopectin is a branched molecule with $(1{\rightarrow}4)$-$\alpha$-D links and $(1{\rightarrow}6)$-$\alpha$-D links at the branch points. The average molecular weights for amyloses and amylopectins from several starches are 100,000–210,000 for amyloses and 1,000,000–6,000,000 for amylopectins.

Starch based polymers, such as starch acetate, have been known to be desirable and biodegradable reactants for the development of food products, fibers, filaments, plastics and other products. Starch acetates may have either low ($\leq 1$) or high ($\sim$2-3) degree of substitution (DS). DS is determined by the number of free hydroxyls on the amylose and amylopectin units of the starch. Various methods of making starch acetate include treating granular starch with acetic acid or acetic anhydride, either alone or in the presence of a catalyst, such as acetic acid, pyridine, sulfuric acid, or an aqueous alkaline solution. For low DS starch acetate polymers, this method is usually employed at high pH 7–11 and at room temperature. High DS starch acetates are prepared similarly, but with longer reaction times. [See, e.g., Kirk-Othmer, *Encyclopedia of Chemical Technology*, 3rd edit, Vol. 21, (John Wiley and Sons, New York, 1978) pp. 504–505; and *Food Chemistry*, 2d edit., Owen R. Fennema, ed., (Marcel Dekker, Inc., New York, 1985) pp. 118–120].

U.S. Pat. No. 5,205,863 describes a method of converting whole flour into starch acetate by combining whole flour with an acetylation agent and adding a catalyst at a reaction temperature of between 50° and 90° C., and precipitating the starch acetate therefrom. In contrast to starch, which is a nearly pure mixture of polysaccharides, flour contains protein (7.5–15.5%) with polysaccharides.

The starch acetate products of such conventional methods for use in foods and in plastics are discolored and are characterized by having less than 10% high molecular weight carbohydrates. This is because the starch is depolymerized during the usually rapid exothermic reaction, ordinarily catalyzed with sulfuric acid. However, since such polymers are subsequently dyed or otherwise colored, the discoloration is acceptable in the industry. However, there exists a need for white, undegraded starch acetate, which has additional properties for use in other areas, such as the production of fibers and filaments.

There thus remains a need in the art for improved methods of preparing starch acetate of a quality useful in other industries.

SUMMARY OF THE INVENTION

The present invention provides a method for synthesizing a starch ester, particularly starch acetate, using an acid catalyst which results in a product characterized by at least about 20% high molecular weight carbohydrates (less depolymerization) and less discoloration (greater whiteness) than starch acetate produced using a prior art catalyst, such as sulfuric acid. The catalyst is desirably an alkyl or aryl sulfonic acid, and preferably methane sulfonic acid (MSA).

Thus, in one aspect, the invention provides a method of catalyzing the acetylation reaction of starch with MSA. The MSA is added to the reaction of a starch, a carboxylic acid and a carboxylic anhydride. Desirably, the carboxylic acid is acetic acid and the carboxylic anhydride is acetic anhydride.

In another aspect, the invention provides a method of catalyzing both the acetylation reaction of starch and the cross-linking reaction of starch acetate without substantially affecting the solubility of the ester in acetone. This involves the use of a first co-catalyst selected from the group consisting of alkyl sulfonic acids and a second co-catalyst selected from the group consisting of phosphate esters.

In another aspect, the invention provides a method for preventing the acetylation reaction of starch from undergoing a rapid exothermic reaction. This involves the heating of the reaction mixture of starch, acetic acid and acetic anhydride to between about 75°–90° C. before the slow addition of MSA diluted with acetic acid.

Other aspects and advantages of the present invention are described further in the following detailed description of the preferred embodiments thereof.

DETAILED DESCRIPTION OF THE INVENTION

The present invention provides methods of synthesizing starch esters, and particularly starch acetate, characterized by improved whiteness, higher molecular weight and less degradation than starch esters produced by conventional processes. The resulting high molecular weight starch acetate is also soluble in acetone or a diluted solution thereof (0–10% water). The starch acetate synthesized by the methods of the invention is useful in the production of fibers, filaments, fibrettes, films, formed plastic shapes and any mechanic variation or combination thereof. Processes for making these goods are well known to those of skill in the art. As used herein, molecular weight refers to starch acetate having $\geq$ about 20%, and preferably at least about 35%, high molecular weight carbohydrates as shown with size exclusion chromatography. Degradation of starch acetate is defined as a decrease in the molecular weight of the polysaccharide(s).

As used herein, a "high molecular weight" starch acetate is defined as that which will elute from two Zorbax PSM bimodel columns (25×6.24 mm) in less than 6.0 minutes using acetone as the mobile phase at a flow rate of 1 mL/min. Polystyrene standards are typically used to generate a molecular weight calibration plot. For example, a polystyrene sample with a molecular weight of 207,700 has a retention time of ~6.9 minutes. In this case, starch acetates with longer retention times are considered to have low molecular weights and those with shorter retention times are considered to have high molecular weights.

As used herein, "acetyl value" refers to the weight percent (wt %) of acetic acid per unit measure of starch acetate. For example, an acetyl value of approximately 62.5 is equivalent to a DS of 3.0.

The term "starch acetate" refers to starch which has been acetylated according to the invention to a degree of substitution (DS) between about 1 to about 3 with an acetyl value of about 20% to about 70%. In a currently preferred embodiment, the DS is 2–3 and the acetyl value is about 42–63%.

Any corn, potato, grain or other suitable starch may be used as the starting material for the processes of the invention. The starch may contain amylose and amylopectin in any suitable ratio. Currently, the preferred starting material is a relatively inexpensive corn starch, which has an amylose to amylopectin ratio of approximately 3:7. However, corn starches having other ratios and other starches can readily be selected by one of skill in the art. For example, waxy maize corn starch which is 100% amylopectin and Hylon VII™ starch which is 70% amylose may also be used, but are currently less preferred because of their expense.

In one aspect of the invention, a starch polymer ester is synthesized by adding starch to a carboxylic acid, adding chilled carboxylic anhydride, then adding the desired esterification catalyst over about 10 minutes. The mixture is then heated to about 75°–95° C. for about 2 to about 3 hours, and preferably to about 85° C. for 2–2.5 hours. In one embodiment, the resulting product is starch triacetate, formed by the reaction of acetic acid and acetic anhydride, using as a catalyst an alkyl or aryl sulfonic acid or methanesulfonic acid (MSA). In a preferred embodiment, the catalyst is MSA.

In addition to acetic acid, one of skill in the art could readily select other suitable carboxylic acids for use in the method of the present invention. Suitable carboxylic acids include those which are liquids at room temperature. Examples of such carboxylic acids include, propionic acid, n-butanoic acid, 2-methylpropanoic (isobutyric) acid, n-pentanoic (valetic) acid), 3-methyl butanoic (isovaleric) acid, hexanoic acid, 2-methyl pentanoic acid, 3-methyl pentanoic acid, n-heptoic acid, cylohexanoic acid, formic acid, mixed acids of acetic and butyric acid, acetic and formic acid, and acetic and propionic acids.

The currently preferred carboxylic anhydride is acetic anhydride. Alternatively, one of skill in the art may readily select another carboxylic anhydride which is liquid at room temperature for use in the method of the invention. Exemplary carboxylic anhydrides include propionic anhydride, n-butyric anhydride, trifluoroacetic anhydride, crotonic anhydride, and n-heptoic anhydride.

Suitable catalysts for the esterification reaction of starch include acid catalysts which do not generate oxidization products or depolymerize the starch. Such catalysts include alkyl or aryl sulfonic acids. In a currently preferred embodiment, methane sulfonic acid (MSA) is the catalyst.

However, included among suitable alkyl sulfonic acids are ethane sulfonic acid, 2-propane sulfonic acid, 1-propane sulfonic acid, 2-methyl-1-propane sulfonic acid, 1-butane sulfonic acid, 3-methyl-1-butane sulfonic acid, 1-heptane sulfonic acid, and trifluoromethane sulfonic acid. Exemplary aryl sulfonic acids include toluenesulfonic acid, benzene sulfonic acid, 2,4-dimethylbenzene sulfonic acid, and tosyl sulfonic acid.

In a further aspect, the method of the invention may be performed using, in addition to the catalyst for the esterification (acetylation) of starch, a co-catalyst. Desirably, this co-catalyst enhances cross-linking of the starch ester without substantially affecting its solubility in acetone. Preferably, this co-catalyst is a phosphoric acid or other phosphate ester. Suitable phosphate esters include pyrophosphate, trisodium phosphate, and the like.

The preferred ratio of MSA:phosphoric acid, based on molar ratios, is between 0.5:1.0 to 50:1.0. The preferred range based on the volumetric ratios for 99% MSA and 85% o-phosphoric acid is between 0.3:1.0 to 80:1.0 MSA to phosphoric acid.

The second catalyst (or co-catalyst) may be added with the first catalyst, or at a later stage in the reaction. Later addition (i.e., after the reaction reaches exotherm) is desirable in the currently preferred embodiment, which uses a first catalyst, MSA, and a second catalyst, a phosphoric acid. Particularly, the phosphoric acid is not added until the reactants have already been heated to about 70° C. to about 90° C., and preferably about 85° C. for about 10 minutes to about 2.5 hours. The phosphoric acid is most preferably added about 45 minutes after the reactants have reached about 85° C.

In another aspect of the invention, the catalyst, e.g., MSA, is diluted with acetic acid and slowly metered in once the reaction has reached between about 75°–90° C. For example, it is desirable to add the catalyst (or catalyst mixture) over a period of an hour after the reaction has been heated to approximately 80° C. In contrast, during the fast addition, all of the catalyst is added to the reaction within 5–15 minutes while that reaction is below 40° C. However, without wishing to be bound by theory, it is believed that, slow addition of the esterification catalyst aids in controlling the exothermic temperature reaction which occurs with esterification and which is ordinarily difficult to control without removing the heating oil bath and replacing it with an ice bath.

Thus, this aspect of the invention provides a method of controlling this exothermic excessive heating which can break down the starch molecules and can decrease the native molecular weight. Particularly, the MSA is diluted to about 0.1% to about 0.5% vol/vol solution with a desired carboxylic acid, preferably acetic acid. The diluted MSA is then added to the reaction over a 30–75 minute period when the reaction has reached between about 75°–90° C. Use of this method prevents the formation of small starch fragments that can easily crystallize or form gels.

The starch acetate is retrieved using conventional means. For example, the starch acetate may be precipitated by pouring or adding the reaction mixture (prior to cooling) to water or a solution of dilute acetic acid. The unreacted reactants are removed by washing. One of skill in the art can readily determine alternative means for recovering the starch acetate and these methods do not limit the present invention.

The following examples illustrate several embodiments of this invention. These examples are illustrative only, and do not limit the scope of the present invention.

EXAMPLE 1

Synthesis of Starch Acetate Using MSA Catalyst

The following example demonstrates the use of MSA having a MW=96.10 and δ=1.480 as a catalyst for the acetylation of starch.

Thirty grams (0.185 moles, if no H$_2$O) Amaizo®-100 [American Maize-Products Co.] corn starch was dried in a vacuum oven overnight at 50° C. To the starch was added 54.00 mL glacial acetic acid at room temperature (about 24° C.) and 54.99 mL cold acetic anhydride (about 3° C.). To this mixture, 0.380 mL of MSA in 5.0 mL glacial acetic acid (5.85×10$^{-3}$ moles MSA) was subsequently added and the mixture was heated to 84° C., while stirring. The reaction was stirred for 2 hours.

This reaction proceeds as follows.

The resulting yield was 46.42 g starch triacetate, which corresponds to 87.0%, if the starch is completely dry. The starch triacetate obtained was a white crystal product.

Color measurements were measured on a MacBeth Color-Eye 7000 spectrophotometer based on the ASTM D 2244-89. The color differences are expressed in terms of approximately uniform visual color perception in CE 1976 CIELAB opponent color space. These color values are L* (lightness), a* (red-green), b* (yellow-blue) as defined in section 6.2.5 of the standard.

+ΔL* lighter
−ΔL* darker
+Δa* redder (less green)
−Δa* greener (less red)
+Δb* yellow (less blue)
−Δb* bluer (less yellow)

The L* values for the starch acetate made with methanesulfonic acid have values that approach 100. The closer to 100, the lighter the material. The closer to zero for both a* and b* the whiter the material.

Using essentially identical protocol, several runs were made. Representative results are provided in Table I. As can be seen from reference to this table, the samples of starch acetate (SA) made with MSA are whiter than SA made with sulfuric acid as the catalyst.

TABLE I

| Name | Catalyst | L* | a* | b* |
|---|---|---|---|---|
| Cellulose Acetate | sulfuric acid | 97.388 | −0.305 | 2.514 |
| Starch Acetate | MSA | 97.273 | −0.74 | 2.86 |
| Starch Acetate | sulfuric acid | 94.261 | −0.032 | 5.618 |
| Starch Acetate (mean of 13 samples) | MSA | 97.6 | 0.08 | 3.1 |

EXAMPLE 2

Synthesis of Starch Acetate Using MSA Catalyst

Starch triacetate was synthesized essentially as described in Example 1 above, with the exception that 1/10 the MSA was used. The reaction solution was viscous after 3.5 hours and the precipitated product stuck to the blades of the blender. The resulting yield was 48.01 g (90.1%).

The increase in viscosity demonstrated in this example is an indication that the acetylation reaction has occurred and that the high molecular weight SA species have not been degraded.

EXAMPLE 3

Molecular Weight of Starch Acetate

The following tables provide data related to the molecular weight of the starch acetate synthesized using the method of the invention. Relative to polystyrene standards, the starch acetate molecules were separated using size exclusion chromatography. The retention time indicates the time it takes a sample to pass through the detector; shorter retention times correspond to larger molecular weight molecules. The percent area is determined based on a computer software program used with the chromatograph that integrates the area percent for each peak.

The data in Table II was obtained using both a Waters 410 refractive index detector and a Viscotek 100 viscosity detector. Two 300×7.5 mm columns were packed with mixed bed B PLgel and a third column was packed with 10 μm, 500 Å PLgel. The mobile phase was tetrahydrofuran at a flow rate of 1.0 mL/min and the sample injection volume of 100 μl at a concentration of 1 mg/mL. A universal calibration curve was used for the molecular weight determinations. The intrinsic viscosity, $IV_w$, values were obtained from the viscosity detector.

TABLE II

| Starch Acetate Sample | Max. Temp, °C. | Acetyl Value | Catalyst | $IV_w$ | Low Mol Wt, $M_w$ | High Mol Wt, $M_w$ |
|---|---|---|---|---|---|---|
| A | 92 | 59.2 | MSA | 0.453 | 760,000 | 53,000,000 |
| B | 120 | 61.8 | $H_2SO_4$ | 0.058 | 1,400 | 21,000 |
| C | 85 | 61.6 | $H_2SO_4$ | 0.176 | 148,000 | 21,000,000 |

The data in Table III was obtained using a Shodex-RI SE-61 refractive index detector with two Zorbax PSM bimodal columns (25×6.24 mm) using acetone as the mobile phase at a flow rate of 1 mL/min and the sample injection volume of 20 μL at a concentration of 10 mg/mL.

High molecular weight starch acetate is defined as that which passes through the detector in less than 6.0 minutes. Based on polystyrene standards are used to generate a molecular weight calibration, polystyrene samples with $M_w$ values of 1,030,000, 207,700, and 13,500, respectively, have retention times of approximately 6.0, 6.9 and 8.1 minutes.

TABLE III

| Starch Acetate Sample | Max. Temp, °C. | Acetyl Value | Catalyst | Peak 1 Rt, min | Peak 1 Area % | Peak 2 Rt, min | Peak 2 Area % | Peak 3 Rt, min | Peak 3 Area % |
|---|---|---|---|---|---|---|---|---|---|
| A | 92 | 59.2 | MSA | 4.4 | 6.9 | 4.8 | 14.8 | 7.0 | 78.0 |
| A-2 | 85 | 57.3 | MSA | 4.4 | 24.1 | 4.8 | 16.8 | 7.1 | 59.0 |
| B | 105 | 61.8 | $H_2SO_4$ | 4.2 | 0.4 | 4.9 | 6.8 | 8.1 | 93.0 |
| C | 85 | 61.6 | $H_2SO_4$ | 4.3 | 0.5 | 4.9 | 6.8 | 7.6 | 92.0 |
| D | 92 | | $H_2SO_4$ | 4.4 | 1.5 | 4.8 | 2.8 | 7.8 | 82.8 |

The data presented in Tables II and III provide results from SA produced according to the invention (using MSA). The chromatogram from the starch acetate made using sulfuric acid has only a small portion of large molecular weight molecules. In the sulfuric acid catalyzed SA samples, the peak with the retention time of approximately 7.0 is usually greater than 80% of the peak area. The conditions used to synthesize samples A and A-2 were identical except that the maximum reaction temperatures were respectively 92° C. and 85° C. The differences in the area percentage for Peak 1 and Peak 3 in Table III are due to the difference in reaction temperature. The high molecular weight peak at -4.4 minutes is 6 to 24% of the starch acetate. When sulfuric acid is the catalyst (samples B, C, and D), the high molecular weight peak at ~4.3 minutes is less ≤2%. This demonstrates that the sulfuric acids decrease the molecular weight of the starch acetate. Samples A and D were prepared in 1 liter reactor heated with circulating water where the temperature profile of the heating was controlled and recorded using a computer. The only difference between the synthesis of A and D from 120 grams of corn starch is that the catalyst for A was 114 μL of methanesulfonic acid and for B was 672 μL of sulfuric acid. The degradation of the amylopectin molecules by the catalyst can be measured by comparing the ratios of the high molecular weight peaks ($R_t$=4.4 and 4.8) versus the low molecular weight peaks ($R_t$~7.5) for A and D. The value for A is 0.28 compared to a value of 0.05 for D indicates that sulfuric acid diminishes the concentration of the high molecular weight starch species.

The data presented in Table II provides results that the SA produced according to the invention (using MSA) has higher intrinsic viscosity than SA made using sulfuric acid.

EXAMPLE 4

Use of Co-catalyst

A. Small Scale Synthesis of Starch Acetate

The apparatus consisted of a 250 mL three-necked, round-bottom flask equipped with a mechanical stirrer, an argon inlet tube, a 10 mL addition funnel, and a thermometer with a Ther-O-Watch® controller. The stirrer speed was maintained at 320 rpm as measured using a Cole-Parmer model 8204-20 tachometer. The flask was set-up in an oil bath fitted with a thermometer and an electric heating coil that was controlled with the Therm-O-Watch®. Thirty grams (0.185 moles) of starch that had been dried in a vacuum oven overnight was added to the flask.

The acetic anhydride (66.4 mL, 0.704 moles) was measured into a glass stoppered volumetric flask, sealed with Parafilm® film and chilled in the refrigerator to 5° C. The starch was stirred with glacial acetic acid (52.9 mL, 0.92 moles) at room temperature for about 2 minutes. Then the cold acetic anhydride was added from the addition funnel over a period of five minutes. The 99.% methanesulfonic acid catalyst (38 μl) was measured using a 1–100 μl Finnpipette® digital variable volume pipetman and diluted with 5.0 mL of glacial acetic acid. The methanesulfonic acid was added to the reaction via the funnel over a period of ten minutes.

Data were recorded for time versus both the reaction temperature and the oil bath temperature. The start of the reaction time was measured once the reaction reached 84° C. and the reaction was maintained at that temperature for 2.5 hours. When the reaction time was completed the clear viscous reaction was poured into distilled water in a large Waring® blender. The ratio of reaction solution to water was maintained at about 1:10. The precipitated product was collected on a Buchner funnel, washed with 2.5 L of distilled water, transferred to a glass jar, and dried at 50° C. in a vacuum oven overnight. The jar was weighed and returned to the vacuum oven until a constant weight was obtained.

B. Large Scale Synthesis of Starch Acetate 4,578 mL (73.1 moles) of glacial acetic acid are added to the 10 L reactor using a funnel with a ground glass joint that fits into a top port of the reactor. 2,754 g (17 moles) of dried corn starch are added through the port. The anhydrous acetic anhydride is chilled to 5° C. in the refrigerator. Portions of 4,969 mL (52.7 moles) of the acetic anhydride are added to a 2 L addition funnel and the anhydride is added to the stirred starch acetic acid mixture. 3.485 mL of methanesulfonic acid is mixed with 460 mL of glacial acetic acid in a 500 mL graduated cylinder. This solution is transferred to the addition funnel. The reactor and the system are purged with dry nitrogen. Slowly the catalyst is added over a 30 minute period. The heating/cooling bath that circulates water through the jacket of the reactor is turned on and the temperature set to ramp to 80° C. over 30 minutes. There is usually an exotherm that occurs at about 75° C. The reaction is allowed to stay at 85° C. until the starch solution becomes transparent (approximately 90 minutes). The 30 L reactor is filled with 27 L of deionized water and the stirring started. Pumping occurs from the bottom of the 10 L reaction to the top of the 30 L reactor. This procedure is used to precipitate the starch acetate. Using another air driven Teflon diaphragm pumps, the SA slurring is moved into the spinning centrifuge. The effluent is collected. The precipitation process is repeated until all the SA has been transferred into the centrifuge bag and washed with water.

Using a pump, the wash water is returned in portions to the 30 L reactor and with stirring, is neutralized with potassium hydroxide. The neutralized water can be pumped into a 55 gallon drum.

The SA product is transferred from the polypropylene centrifuge bag to glass trays and dried at 50° C. in a vacuum oven to constant dryness.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A method for the production of starch ester polymer comprising
   catalyzing the synthesis of starch esters from the reaction of
   (a) a starch,
   (b) a carboxylic acid selected from carboxylic acids which are liquid at room temperature, and
   (c) a carboxylic anhydride, selected from carboxylic anhydrides which are liquid at room temperature with an acid catalyst which does not generate oxidation products and does not depolymerize the starch,
   wherein the starch ester is characterized by at least about 20% high molecular weight carbohydrates, as determined using size exclusion chromatography, and is white in color.

2. The method according to claim 1 further comprising the steps of heating the reaction to between 75° C. and 90° C. and slowly adding the acid catalyst to the reaction.

3. The method according to claim 1 wherein said catalyst is an alkyl sulfonic acid selected from the group consisting of methane sulfonic acid, ethane sulfonic acid, 2-propane sulfonic acid, 1-propane sulfonic acid, 2-methyl-1-propane sulfonic acid, 1-butane sulfonic acid, 3-methyl-1-butane sulfonic acid, 1-heptane sulfonic acid, and trifluoromethane sulfonic acid.

4. The method according to claim 1 wherein said catalyst is an aryl sulfonic acid selected from the group consisting of toluenesulfonic acid, benzene sulfonic acid, and 2,4-dimethylbenzene sulfonic acid.

5. The method according to claim 1 wherein said catalyst is methane sulfonic acid.

6. The method according to claim 1 wherein said starch ester is starch acetate, said carboxylic acid is acetate acid, and said carboxylic anhydride is acetate anhydride.

7. The method according to claim 6 wherein said starch acetate has a degree of substitution of between 1 and 3.

8. The method according to claim 1 wherein said starch is corn starch.

9. The method according to claim 1 wherein the starch ester is characterized by at least about 35% high molecular weight carbohydrates, as determined using size exclusion chromatography.

10. The method according to claim 1 further comprising adding to said reaction a co-catalyst, capable of catalyzing cross-linking of said starch ester, without substantially effecting the solubility of the ester in acetone.

11. The method according to claim 10 wherein said co-catalyst is a phosphate ester.

12. The method according to claim 11 wherein said phosphate ester is selected from the group consisting of phosphoric acid, pyrophosphate and trisodium phosphate.

13. A method for the production of starch acetate polymer comprising the steps of:

heating corn starch, with acetic acid and acetic anhydride in the presence of an acid catalyst which does not generate oxidation products and does not depolymerize the starch under conditions at which the reaction reaches exotherm; and precipitating starch acetate from said reaction product, wherein said starch acetate is characterized by at least about 20% high molecular weight carbohydrates, as determined using size exclusion chromatography, is white in color and is soluble in acetone and water.

14. The method according to claim 13 wherein said conditions comprise heating said reactants at a temperature of between about 75° C. to about 95° C. for between about 2 to about 3 hours.

15. The method according to claim 13 wherein said conditions comprise heating said reactants at a temperature of about 85° C. for about 2 to 2.5 hours.

16. The method according to claim 14 further comprising adding to said reactants after said temperature leaches exotherm, a co-catalyst capable of catalyzing cross-linking of said starch acetate, without substantially effecting the solubility of the ester in acetone.

17. The method according to claim 16 comprising adding said co-catalyst at between 10 minutes to 2.5 hours after said reaction reaches 75° C. to 90° C.

18. The method according to claim 17 wherein said co-catalyst is added at about 45 minutes after said reaction reaches 75° C. to 90° C.

19. The method according to claim 13 wherein said precipitating step comprises adding the reaction mixture to water and washing out the unreacted reactants.

20. The method according to claim 13 wherein said precipitating step comprises adding the reaction mixture to dilute acetic acid and washing out the unreacted reactants.

21. The method according to claim 13 wherein said catalyst is selected from the group consisting of methane sulfonic acid, ethane sulfonic acid, 2-propane sulfonic acid, 1-propane sulfonic acid, 2-methyl-1-propane sulfonic acid, 1-butane sulfonic acid, 3-methyl-1-butane sulfonic acid, 1-heptane sulfonic acid, trifluoromethane sulfonic acid, toluenesulfonic acid, benzene sulfonic acid, and 2,4-dimethylbenzene sulfonic acid.

22. The method according to claim 16 wherein said co-catalyst is selected from the group consisting of phosphoric acid, pyrophosphate and trisodium phosphate.

23. The method according to claim 13, wherein said starch acetate is characterized by at least about 35% high molecular weight carbohydrates, as determined using size exclusion chromatography.

24. A starch acetate polymer having at least about 20% high molecular weight carbohydrates, as determined using size exclusion chromatography, and which is white in color and soluble in acetone, said polymer produced by the method of claim 1.

* * * * *